United States Patent
Yazaki

(10) Patent No.: US 10,128,702 B2
(45) Date of Patent: Nov. 13, 2018

(54) ROTOR OF ROTARY ELECTRIC MACHINE AND METHOD OF PRODUCING THE SAME

(71) Applicant: HONDA MOTOR CO., LTD., Tokyo (JP)

(72) Inventor: Manabu Yazaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 261 days.

(21) Appl. No.: 14/997,574

(22) Filed: Jan. 18, 2016

(65) Prior Publication Data

US 2016/0211711 A1    Jul. 21, 2016

(30) Foreign Application Priority Data

Jan. 19, 2015    (JP) .................................. 2015-007886

(51) Int. Cl.
| | |
|---|---|
| *H02K 1/27* | (2006.01) |
| *H02K 15/03* | (2006.01) |
| *H02K 1/28* | (2006.01) |
| *H02K 1/30* | (2006.01) |

(52) U.S. Cl.
CPC .............. *H02K 1/276* (2013.01); *H02K 1/28* (2013.01); *H02K 15/03* (2013.01); *H02K 1/30* (2013.01)

(58) Field of Classification Search
CPC ........................... H02K 2201/06; H02K 1/276
See application file for complete search history.

(56) References Cited

U.S. PATENT DOCUMENTS

| | | | | |
|---|---|---|---|---|
| 4,642,502 A | * | 2/1987 | Carpenter .............. | H02K 1/278 310/156.12 |
| 5,760,520 A | * | 6/1998 | Hasebe ................... | H02K 1/278 310/156.15 |
| 5,990,591 A | * | 11/1999 | Yamaguchi ............. | H02K 1/276 310/12.18 |

(Continued)

FOREIGN PATENT DOCUMENTS

| | | |
|---|---|---|
| CN | 101577450 | 11/2009 |
| JP | 5118920 B2 | 3/2009 |

OTHER PUBLICATIONS

Chinese Office Action for corresponding CN Application No. 201510970863.6, dated Nov. 13, 2017 (w/ English machine translation).

*Primary Examiner* — Dang Le
(74) *Attorney, Agent, or Firm* — Mori & Ward, LLP

(57) ABSTRACT

A rotor of a rotary electric machine includes a rotor core. The rotor core has magnet insertion holes which are arranged at first circumferential intervals and in which permanent magnets are disposed. The rotor core includes steel plates, a first core block, and a second core block. The steel plates are stacked in an axial direction of the rotor. The first core block includes first steel plates among the steel plates stacked with rotational stacking at a rotational stacking angle corresponding to a common multiple of a first circumferential interval among the first circumferential intervals and a second circumferential interval among second circumferential intervals. The second core block includes second steel plates among the steel plates stacked with the rotational stacking at the rotational stacking angle from a position shifted by an angle corresponding to the first circumferential interval relative to the first core block.

19 Claims, 14 Drawing Sheets

(56) References Cited

U.S. PATENT DOCUMENTS

| | | | |
|---|---|---|---|
| 7,518,277 B2 * | 4/2009 | Nemoto | H02K 29/03 310/156.45 |
| 8,030,868 B2 * | 10/2011 | Yamagishi | E01H 5/04 310/114 |
| 2002/0079778 A1 | 6/2002 | Ohmura et al. | |

* cited by examiner

BACKGROUND ART

ROTOR OF ROTARY ELECTRIC MACHINE AND METHOD OF PRODUCING THE SAME

CROSS-REFERENCE TO RELATED APPLICATIONS

The present application claims priority under 35 U.S.C. § 119 to Japanese Patent Application No. 2015-007886, filed Jan. 19, 2015, entitled "Rotor of Rotary Electric Machine and Method of Producing the Same." The contents of this application are incorporated herein by reference in their entirety.

BACKGROUND

1. Field

The present disclosure relates to a rotor of a rotary electric machine and a method of producing a rotor of a rotary electric machine.

2. Description of the Related Art

Widely known rotors used in rotary electric machines include a rotor core including magnetic steel sheets stacked on one another (see FIG. 13 and FIG. 14, or Japanese Patent No. 5118920, for example).

As illustrated in FIG. 13, a rotor 100 of a widely known rotary electric machine includes a rotor core 105 including steel plates 101 stacked on one another, permanent magnets, and a rotor shaft. The permanent magnets and the rotor shaft are not illustrated. The rotor core 105 has magnet insertion holes 103 arranged at first circumferential intervals (45° intervals, for example). The permanent magnets are disposed in the magnet insertion holes 103. The rotor shaft is disposed in a shaft hole 107 positioned in the middle of the rotor core 105.

As illustrated in FIG. 14, the steel plates 101 included in the rotor core 105 each have magnet insertion hole pieces 103a and through hole pieces 109a. The magnet insertion hole pieces 103a are arranged at the first circumferential intervals in the circumferential direction. The through hole pieces 109a, which extend through the steel plate 101 in the axial direction, are positioned inward from the magnet insertion hole pieces 103a and arranged at second circumferential intervals (45° intervals, for example).

In the steel plate 101, an inner annular section 111a positioned radially inward from the through hole pieces 109a and an outer annular section 113a positioned radially outward from the through hole pieces 109a are connected through ribs 115 positioned between the through hole pieces 109a.

The steel plates 101 having the same configuration are stacked in the axial direction so as to constitute the rotor core 105 having the magnetic insertion holes 103, which are provided by the magnetic insertion hole pieces 103a in the steel plates 101, the through holes 109, which are provided by the through hole pieces 109a in the steel plates 101, and rotor core inner and outer sections 111 and 113, respectively, which are provided by the inner annular section 111a and the outer annular section 113a of the steel plates 101. In other words, the rotor core 105 looks like an extension of the steel plate 101 elongated in the stacking direction (axial direction).

During the production of the rotor core 105, every predetermined number of the steel plates 101 (ten, for example) may be rotated by an angle corresponding to the first circumferential interval so as to reduce the accumulated thickness deviation due to the stacking of the steel plates 101. In such a case, the through hole pieces 109a in axially adjacent steel plates 101 overlap each other when viewed in the axial direction, since the first and second circumferential interval are the same in the steel plates 101. Thus, the rotor core 105 looks like an extension of the steel plate 101 elongated in the stacking direction (axial direction).

In such a rotor core 105, the ribs 115 of the stacked steel plates 101 overlap each other when viewed in the axial direction. Thus, stress concentrates on an inner connecting section 117 between the rib 115 and the inner annular section 111a (rotor core inner section 111). The inner annular section 111a (rotor core inner section 111) and the rotor shaft inserted into the shaft hole 107 needs to have a locally-increased thickness at circumferential portions corresponding to the inner connecting section 117 such that the rotor core 105 has sufficient strength. Practically, an increase in the overall thickness of the inner annular section 111a (rotor core inner section 111) and an increase in the overall thickness of the rotor shaft are required.

The through hole 109 looks like an extension of the through hole piece 109a elongated in the axial direction. If the rotor 100 is used in the presence of oil (liquid cooling), the oil may enter the through hole 109 through spaces between the stacked steel plates 101, for example. In such a case, the oil may accumulate in one of the through holes 109. The accumulation of the oil in one of the through holes 109 may lead to eccentricity (imbalance) of the rotor 100. This may increase vibrations and noise during the rotation, deteriorating the quality of the rotor.

To solve the above-described problems, the rotor of the rotary electric machine disclosed in Japanese Patent No. 5118920 may be used. The rotor of the rotary electric machine disclosed in Japanese Patent No. 5118920 includes a rotor core which is fixed to the rotor shaft and has refrigerant passages. The rotor core includes first plates and second plates stacked on one another in the axial direction.

The first plate has first holes, which constitute the refrigerant passages, and a first rotation stopper configured to be fitted to the rotor shaft so as to prevent the first plate from rotating with respect to the rotor shaft. The second plate has second holes, which constitute the refrigerant passages, at positions displaced from the first holes in the circumferential direction, and a second rotation stopper configured to be fitted to the rotor shaft so as to prevent the second plate from rotating with respect to the rotor shaft.

When the first plate and the second plate are stacked in the axial direction, the first holes and the second holes, which are displaced from each other in the circumferential direction, are in communication with each other. In addition, the first and second holes overlapping each other constitute a hole extending around the rotor shaft in the circumferential direction as a whole. This configuration enables a refrigerant medium to be supplied evenly to the rotor core in the circumferential direction. In addition, since the ribs between the circumferentially adjacent first holes and the ribs between the circumferentially adjacent second holes are displaced from each other in the circumferential direction, stress does not concentrate on a base of each rib.

SUMMARY

According to one aspect of the present invention, a rotor of a rotary electric machine includes a rotor core and permanent magnets. The rotor core has a plurality of magnet insertion holes arranged at first circumferential intervals. The rotor core includes a plurality of steel plates. Each of the plurality of steel plates has a plurality of magnetic insertion hole pieces and a plurality of through hole pieces. The plurality of magnetic insertion hole pieces are arranged at the first circumferential intervals and constitute the plurality of magnetic insertion holes when the plurality of steel plates are stacked on one another. The plurality of through hole pieces are arranged at second circumferential intervals different from the first circumferential intervals and extend through the plurality of steel plates in an axial direction. The permanent magnets are disposed in the plurality of magnet insertion holes. The rotor core includes a first core block including the plurality of steel plates stacked by rotational stacking at a rotational stacking angle corresponding to a common multiple of the first circumferential interval and the second circumferential interval, and a second core block including the plurality of steel plates stacked by the rotational stacking at the rotational stacking angle corresponding to the common multiple from a position shifted by an angle corresponding to the first circumferential interval relative to the first core block.

According to another aspect of the present invention, a method of producing a rotor of a rotary electric machine includes producing a rotor core. The rotor includes the rotor core and permanent magnets. The rotor core has a plurality of magnet insertion holes arranged at first circumferential intervals. The rotor core includes a plurality of steel plates. Each of the plurality of steel plates has a plurality of magnetic insertion hole pieces and a plurality of through hole pieces. The plurality of magnetic insertion hole pieces are arranged at the first circumferential intervals and constitute the plurality of magnetic insertion holes when the plurality of steel plates are stacked on one another. The plurality of through hole pieces are arranged at second circumferential intervals different from the first circumferential intervals and extend through the plurality of steel plates in an axial direction. The permanent magnets are disposed in the plurality of magnet insertion holes. In the step of producing the rotor core, a first rotational stacking step at a rotational stacking angle corresponding to a common multiple of the first circumferential interval and the second circumferential interval is performed so as to stack the plurality of steel plates. A second rotational stacking step at the rotational stacking angle corresponding to the common multiple from a position shifted by an angle corresponding to the first circumferential interval relative to the plurality of steel plates stacked in the first rotational stacking step is performed so as to stack the plurality of steel plates.

According to further aspect of the present invention, a method of producing a rotor of a rotary electric machine includes producing a rotor core. The rotor includes the rotor core and permanent magnets. The rotor core has a plurality of magnet insertion holes arranged at first circumferential intervals. The rotor core includes a plurality of steel plates. Each of the plurality of steel plates has a plurality of magnetic insertion hole pieces and a plurality of through hole pieces. The plurality of magnetic insertion hole pieces are arranged at the first circumferential intervals and constitute the plurality of magnetic insertion holes when the plurality of steel plates are stacked on one another. The plurality of through hole pieces are arranged at second circumferential intervals different from the first circumferential intervals and extend through the plurality of steel plates in an axial direction. The permanent magnets are disposed in the plurality of magnet insertion holes. In the step of producing the rotor core, a first core block is formed by rotational stacking of the plurality of steel plates at a rotational stacking angle corresponding to a common multiple of the first circumferential interval and the second circumferential interval. A second core block is formed by the rotational stacking of the plurality of steel plates at the rotational stacking angle corresponding to the common multiple from a position shifted by the angle of the first circumferential interval relative to the first core block.

According to further aspect of the present invention, a rotor of a rotary electric machine includes a rotor core. The rotor core has magnet insertion holes which are arranged at first circumferential intervals and in which permanent magnets are disposed. The rotor core includes steel plates, a first core block, and a second core block. The steel plates are stacked in an axial direction of the rotor. Each of the steel plates includes magnetic insertion hole pieces and through hole pieces. The magnetic insertion hole pieces are arranged at the first circumferential intervals to constitute the magnetic insertion holes. The through hole pieces are arranged at second circumferential intervals to extend through the steel plates in the axial direction. The first core block includes first steel plates among the steel plates stacked with rotational stacking at a rotational stacking angle corresponding to a common multiple of a first circumferential interval among the first circumferential intervals and a second circumferential interval among the second circumferential intervals. The second core block includes second steel plates among the steel plates stacked with the rotational stacking at the rotational stacking angle from a position shifted by an angle corresponding to the first circumferential interval relative to the first core block.

According to further aspect of the present invention, a method of producing a rotor of a rotary electric machine includes providing steel plates. The rotor includes a rotor core having magnet insertion holes which are arranged at first circumferential intervals and in which permanent magnets are disposed. The rotor core includes the steel plates stacked in an axial direction of the rotor. Each of the steel plates includes magnetic insertion hole pieces and through hole pieces. The magnetic insertion hole pieces are arranged at the first circumferential intervals to constitute the magnetic insertion holes. The through hole pieces are arranged at second circumferential intervals to extend through the steel plates in the axial direction. First steel plates among the steel plates are stacked with first rotational stacking at a rotational stacking angle corresponding to a common multiple of a first circumferential interval among the first circumferential intervals and a second circumferential interval among the second circumferential intervals. Second steel plates among the steel plates are stacked with second rotational stacking at the rotational stacking angle from a position shifted by an angle corresponding to the first circumferential interval relative to the first steel plates.

According to the other aspect of the present invention, a method of producing a rotor of a rotary electric machine includes providing steel plates. The rotor includes a rotor core having magnet insertion holes which are arranged at first circumferential intervals and in which permanent magnets are disposed. The rotor core includes the steel plates stacked in an axial direction of the rotor. Each of the steel plates includes magnetic insertion hole pieces and through hole pieces. The magnetic insertion hole pieces are arranged at the first circumferential intervals to constitute the magnetic insertion holes. The through hole pieces are arranged at second circumferential intervals to extend through the steel plates in the axial direction. First steel plates among the steel plates are stacked with rotational stacking at a rotational stacking angle corresponding to a common multiple of a first circumferential interval among the first circumferential intervals and a second circumferential interval among the second circumferential intervals so as to provide a first core block. Second steel plates among the steel plates are stacked with the rotational stacking at the rotational stacking angle from a position shifted by an angle corresponding to the first circumferential interval relative to the first core block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
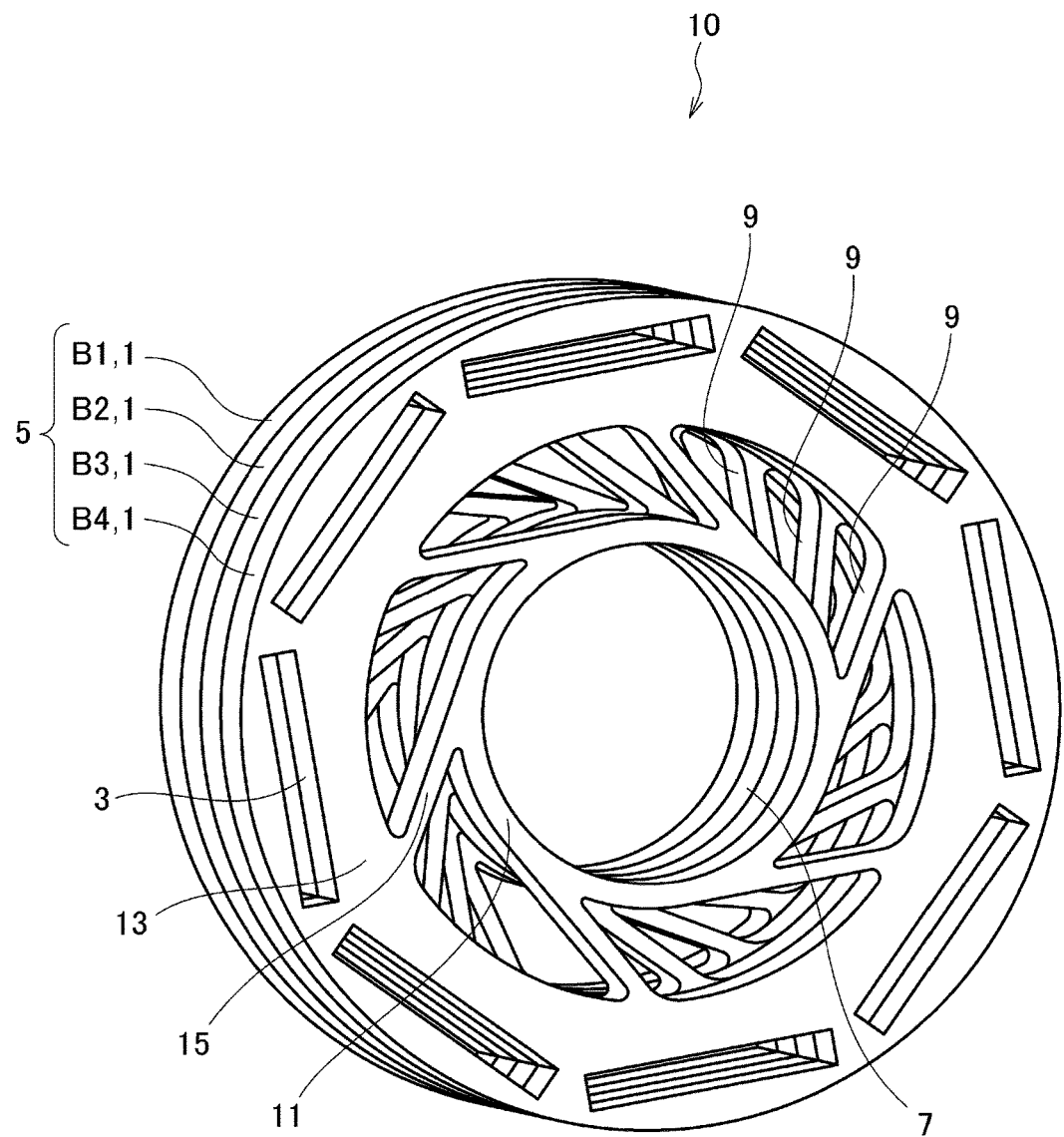
FIG. 1 is a perspective view of a rotor (rotor core) according to a first embodiment of the present disclosure.

The embodiments will now be described with reference to the accompanying drawings, wherein like reference numerals designate corresponding or identical elements throughout the various drawings.

First Embodiment

Figure 2:
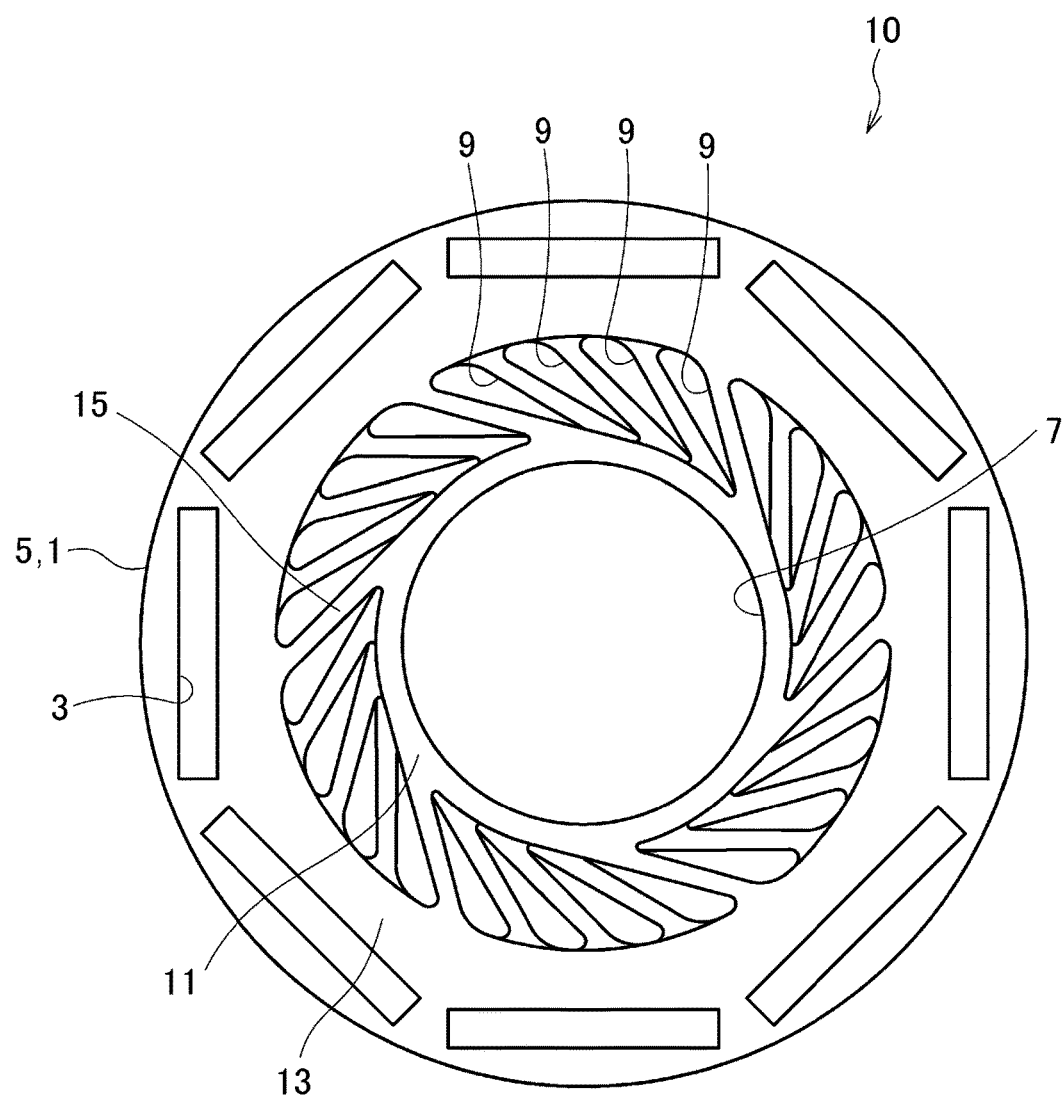
FIG. 2 is a front view of the rotor (rotor core) according to the first embodiment of the present disclosure.
Figure 3:
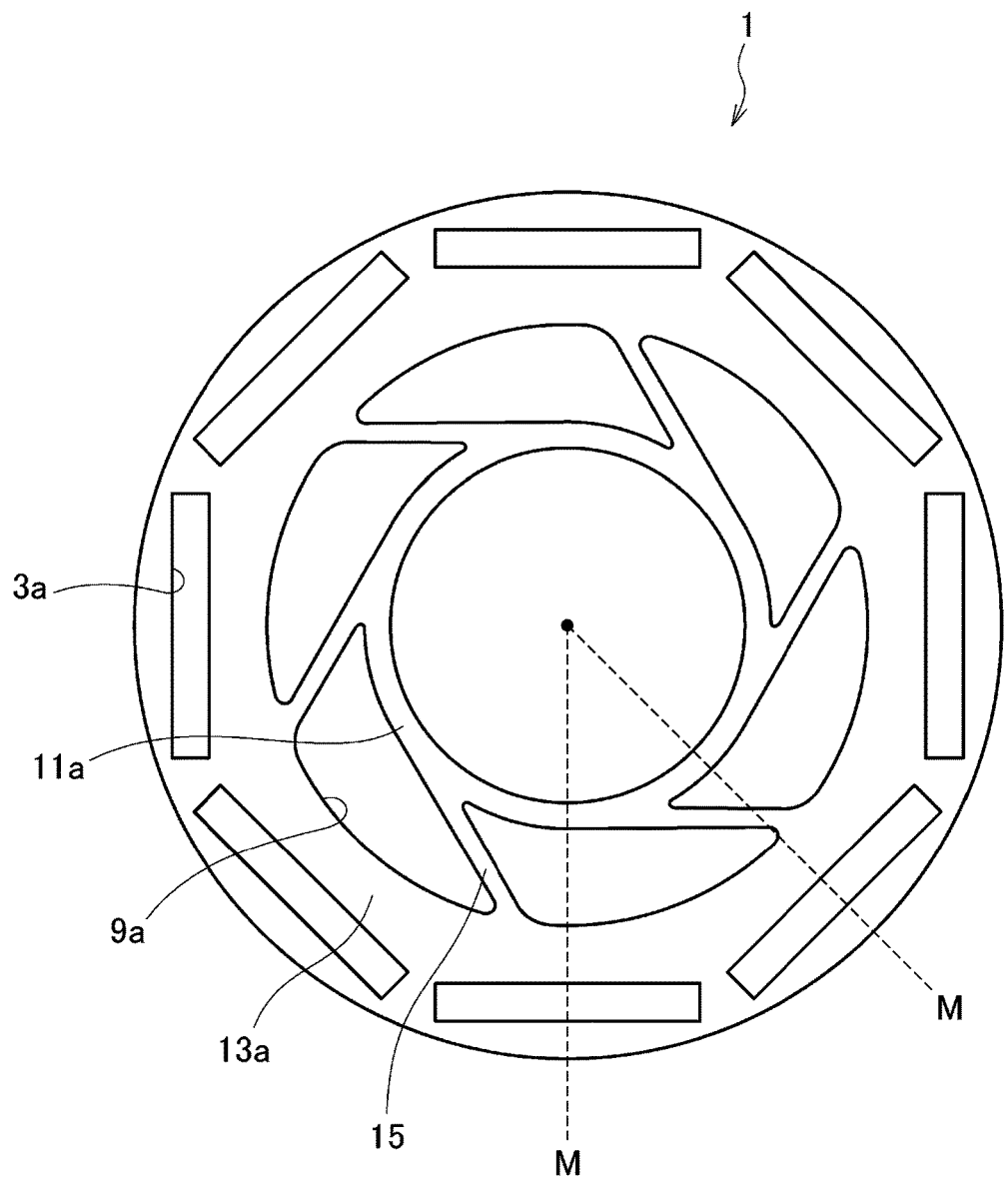
FIG. 3 is a front view of a steel plate included in the rotor core according to the first embodiment of the disclosure.
Figure 4:
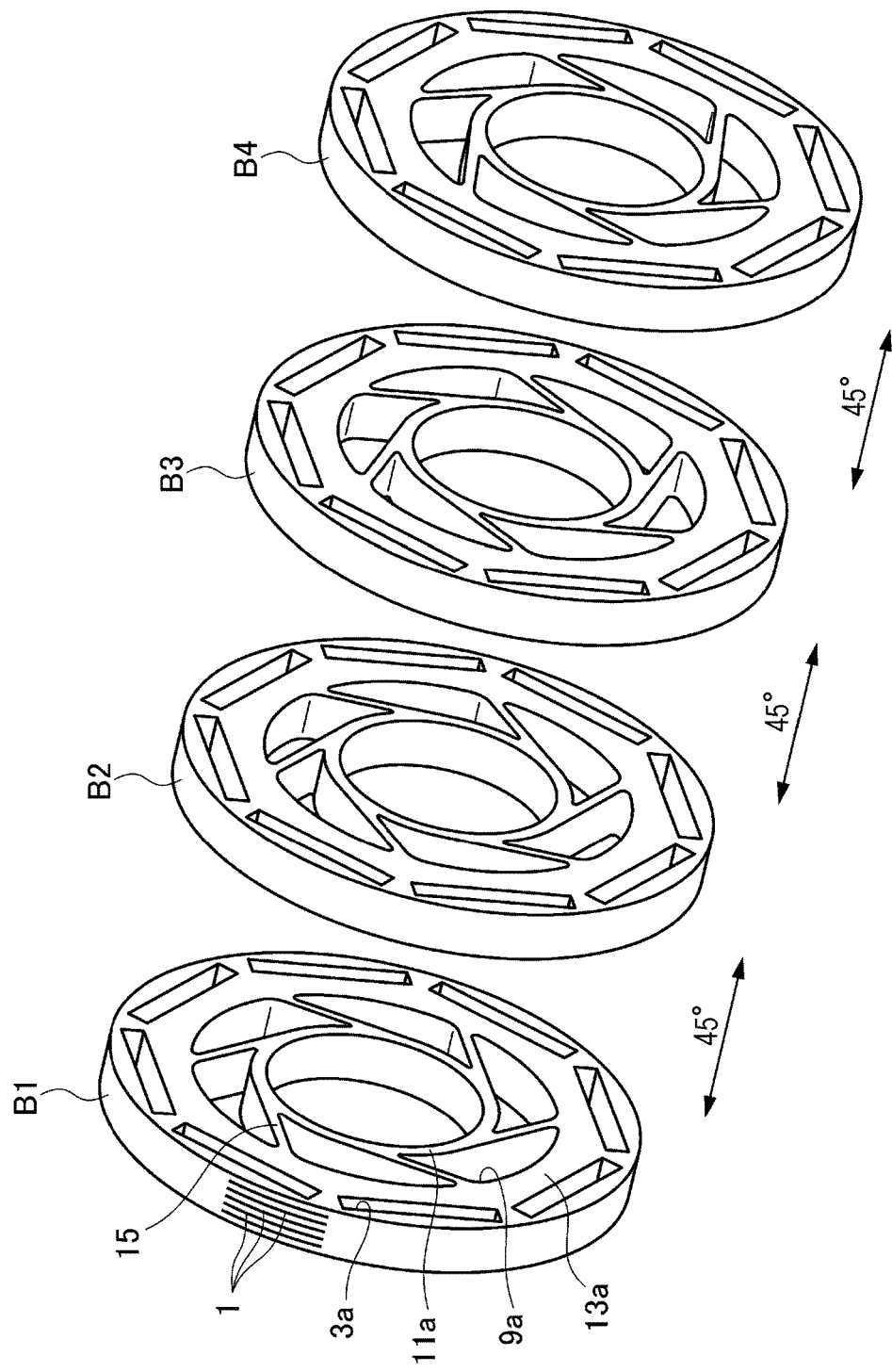
FIG. 4 is a perspective view of a core block included in the rotor core according to the first embodiment of the disclosure.

Hereinafter, one embodiment of a rotor of a rotary electric machine according to the present disclosure and a method of producing the same is described with reference to the drawings. FIG. 1 is a perspective view of a rotor 10 (rotor core 5) according to a first embodiment of the present disclosure. FIG. 2 is a front view of the rotor 10 (rotor core 5) of the first embodiment. FIG. 3 is a front view of a steel plate 1 included in the rotor core 5 of the first embodiment. FIG. 4 is a perspective view of core blocks B1 to B4 included in the rotor core 5 of the first embodiment.

As illustrated in FIG. 1 and FIG. 2, the rotor 10 of a rotary electric machine according to the first embodiment includes a rotor core 5 having a plurality of (eight) magnet insertion holes 3 arranged at first circumferential intervals (45° intervals), permanent magnets disposed in the magnet insertion holes 3, and a rotor shaft disposed in a shaft hole 7 positioned in the middle of the rotor core 5. The rotor core 5 includes a plurality of stacked steel plates 1. The permanent magnets and the rotor shaft are not illustrated.

As illustrated in FIG. 3, the steel plates 1 included in the rotor core 5 each have a plurality of (eight) magnet insertion hole pieces 3a arranged at the first circumferential intervals (45° intervals) in the circumferential direction, and a plurality of (six) through hole pieces 9a positioned inward from the magnet insertion hole pieces 3a and arranged at second circumferential intervals (60° intervals). The through hole pieces 9a extend through the steel plates 1 in the axial direction.

In the steel plate 1, an inner annular section 11a, which is positioned inward from the through hole pieces 9a, and an outer annular section 13a, which is positioned outward from the through hole pieces 9a, are connected through a plurality of (six) ribs 15 positioned between the through hole pieces 9a. The ribs 15 extend in one circumferential direction (anticlockwise direction) toward the radially outer end. The through hole pieces 9a between the ribs 15 each have a wing-like shape in front view. The through hole pieces 9a are each non-symmetric with respect to an imaginary line M, which extends in a radial direction through the middle of each magnet insertion hole 3 in the circumferential direction.

As illustrated in FIG. 4, the steel plates 1 (10 steel plates, for example) are stacked on one another so as to constitute each of the core blocks B1 to B4. The steel plates 1 are stacked such that the magnet insertion hole pieces 3a overlap with each other and the through hole pieces 9a overlap with each other. The core blocks B1 to B4 having the above-described configuration are rotated in the circumferential direction by an angle corresponding to the first circumferential interval (45°) and stacked one by one to form the rotor core 5. The steel plates 1 may be rotated in the circumferential direction and stacked by "rotational stacking", in which the steel plates 1, which are punched out in a step of punching the steel plates 1, are rotated and stacked one by one.

As illustrated in FIG. 1 and FIG. 2, the rotor core 5 having the above-described configuration has the magnetic insertion holes 3 each provided by the magnetic insertion hole pieces 3a in the core blocks B1 to B4, the through holes 9 each provided by the through hole pieces 9a in the core blocks B1 to B4, and the inner and outer rotor core sections 11 and 13, respectively, provided by the inner and outer annular sections 11a and 13a, respectively, of the core blocks B1 to B4.

The through holes 9 in the core blocks B1 to B4, which are stacked in the axial direction by the rotational stacking, are displaced from the through holes 9 in adjacent core blocks B1 to B4 by an angle (15°) corresponding to the difference between the first circumferential interval and the second circumferential interval and are in communication with each other. With this configuration, the through holes 9 adjacent to each other in the circumferential direction in each of the core blocks B1 to B4 are in communication with each other through the through holes 9 in the other one of the core blocks B1 to B4, which are stacked in the axial direction. In this configuration, all the through holes 9 in all the core blocks B1 to B4 are in communication with each other. This reduces the concentration and accumulation of oil in a particular one of the through holes 9 when the rotor 10 is used in the presence of oil (liquid cooling). Thus, eccentricity of the rotor 10 is prevented. In this configuration, the through holes 9 in the core blocks B1 to B4 each have a sufficient thickness at a section in communication with adjacent through holes 9, since the core blocks B1 to B4 each include the plurality of steel plates 1. This allows the oil to readily flow through the through holes 9.

In the rotor core 5 viewed in the axial direction (see FIG. 2), the number of the ribs 15, which extend from the rotor core inner section 11 to the rotor core outer section 13, is {the number of the ribs 15 extending from the inner annular section 11a to the outer annular section 13a in one of the core blocks B1 to B4 (6 ribs)×the number of times rotational stacking is performed in order to position the ribs 15 of the core blocks B1 to B4 at overlapping positions (4 times)=24 ribs}. The number of the ribs 15 in the rotor core 5 is larger than that in each of the core blocks B1 to B4 (6 ribs). This configuration allows the stress acting on the rotor shaft or the rotor core inner section 11 to be dispersed through the ribs 15. The rotor core 105 is able to have sufficient strength without an increase in the size of the rotor shaft or an increase in the size of the rotor core inner section 11.

In addition, the production of the rotor core 5 of the present embodiment does not require a step of turning over the steel plate 1 before stacking as in Japanese Patent No. 5118920. The production efficiency is not decreased.

The rotor core 5 of the present embodiment having the above-described configuration reduces eccentricity of the rotor 10 and concentration of stress without a decrease in the production efficiency, compared with Japanese Patent No. 5118920. However, core blocks including a plurality of stacked steel plates may have an accumulated thickness deviation of the steel plates and may decrease dimensional accuracy of the rotor core.

To solve the problem, the core blocks B1 to B4 are each obtained by the rotational stacking of the steel plates 1 at the rotational stacking angle corresponding to the common multiple of the first circumferential interval and the second circumferential interval. In addition, to stack the core blocks B1 to B4 at the rotational stacking angle of 45°, the core blocks B2 to B4, which are positioned on one of the core blocks B1 to B3, are obtained by the rotational stacking of the steel plates 1 at the rotational stacking angle corresponding to the common multiple from a position shifted by the angle corresponding to the first circumferential interval relative to an adjacent one of the core blocks B1 to B3 positioned below. The rotor core 5 including the stacked core blocks B1 to B4 is obtained by repeatedly performing the above-described rotational stacking.

In the core blocks B1 to B4, which are produced by the rotational stacking of the steel plates 1, the accumulated thickness deviation of the steel plates 1 in each core block B1 to B4 is reduced and dimensional accuracy of the rotor core 5 is improved without a decrease in the production efficiency. In addition, since the steel plates 1 are stacked by the rotational stacking at the rotational stacking angle corresponding to the common multiple of the first circumferential interval and the second circumferential interval, the magnet insertion hole pieces 3a in the steel plates 1 of the core blocks B1 to B4 are in communication with each other linearly in the axial direction and the through hole pieces 9a in the steel plates 1 of the core blocks B1 to B4 are in communication with each other linearly in the axial direction, although the steel plates 1 are stacked one by one by the rotational stacking.

In this embodiment, the common multiple is the least common multiple of the first circumferential interval and the second circumferential interval. Specifically, since the first circumferential interval is 45° and the second circumferential interval is 60° in the present embodiment, the steel plates 1 are stacked one by one by the rotational stacking at the angle corresponding to the least common multiple of 180°.

A method of producing the rotor core 5 according to the first embodiment of the present disclosure is described with reference to FIG. 5 to FIG. 8. In the following description, the number of the magnet insertion hole pieces 3a is eight, the number of the through hole pieces 9a is six, the first circumferential interval is 45°, the second circumferential interval is 60°, the common multiple (least common multiple) of the first and second circumferential intervals is 180°, the number of the steel plates 1 to be included in each core block B1 to B4 is γ, the rotational stacking angle of the steel plate 1 is 0, and the number of the stacked steel plates 1 is m. The number of the core blocks B1 to B4 is not determined.

Figure 5:
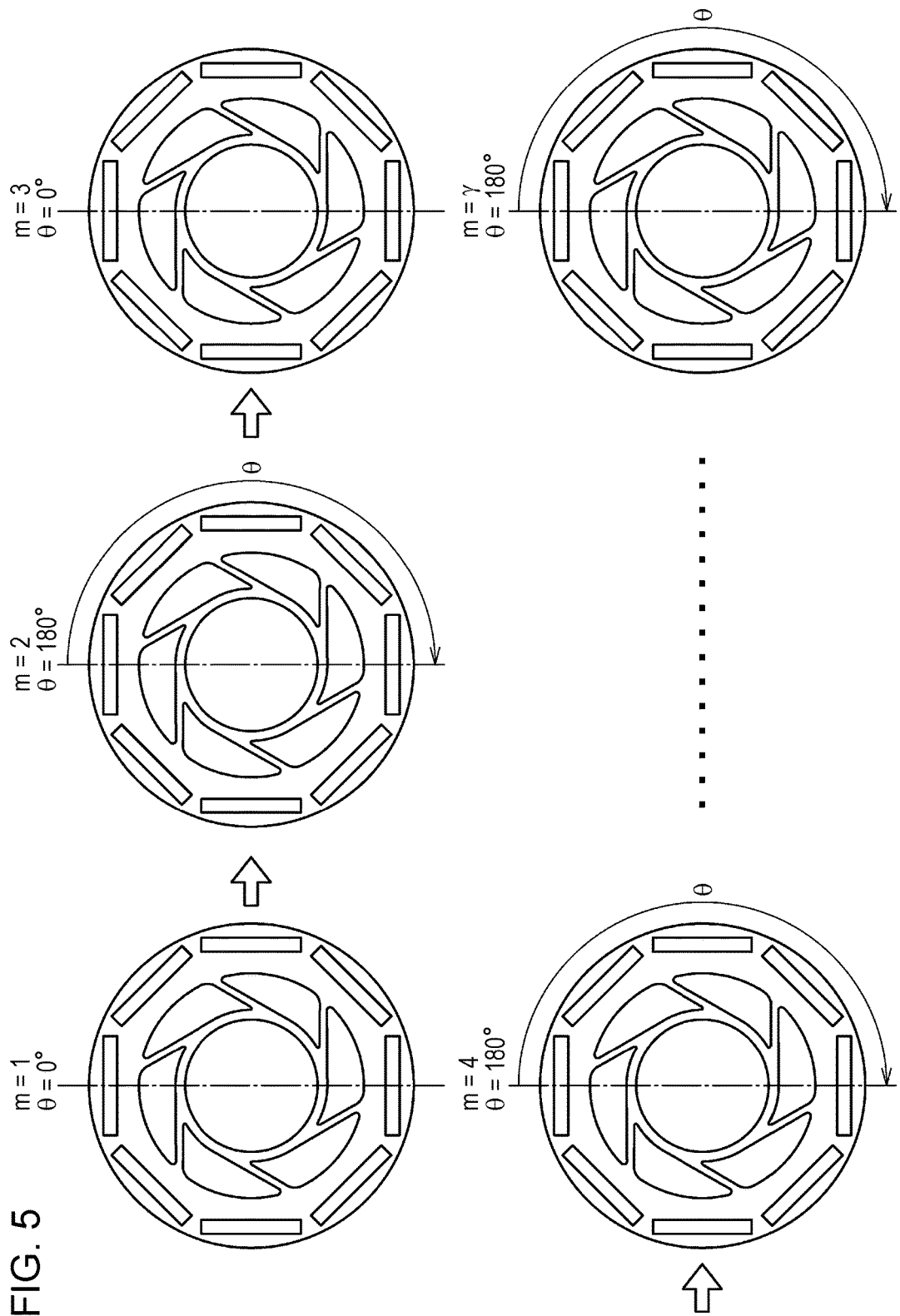
FIG. 5 is a view indicating production steps of the rotor core according to the first embodiment of the disclosure and indicating how rotational stacking of the steel plates is performed in the production steps of the first core block.
Figure 6:
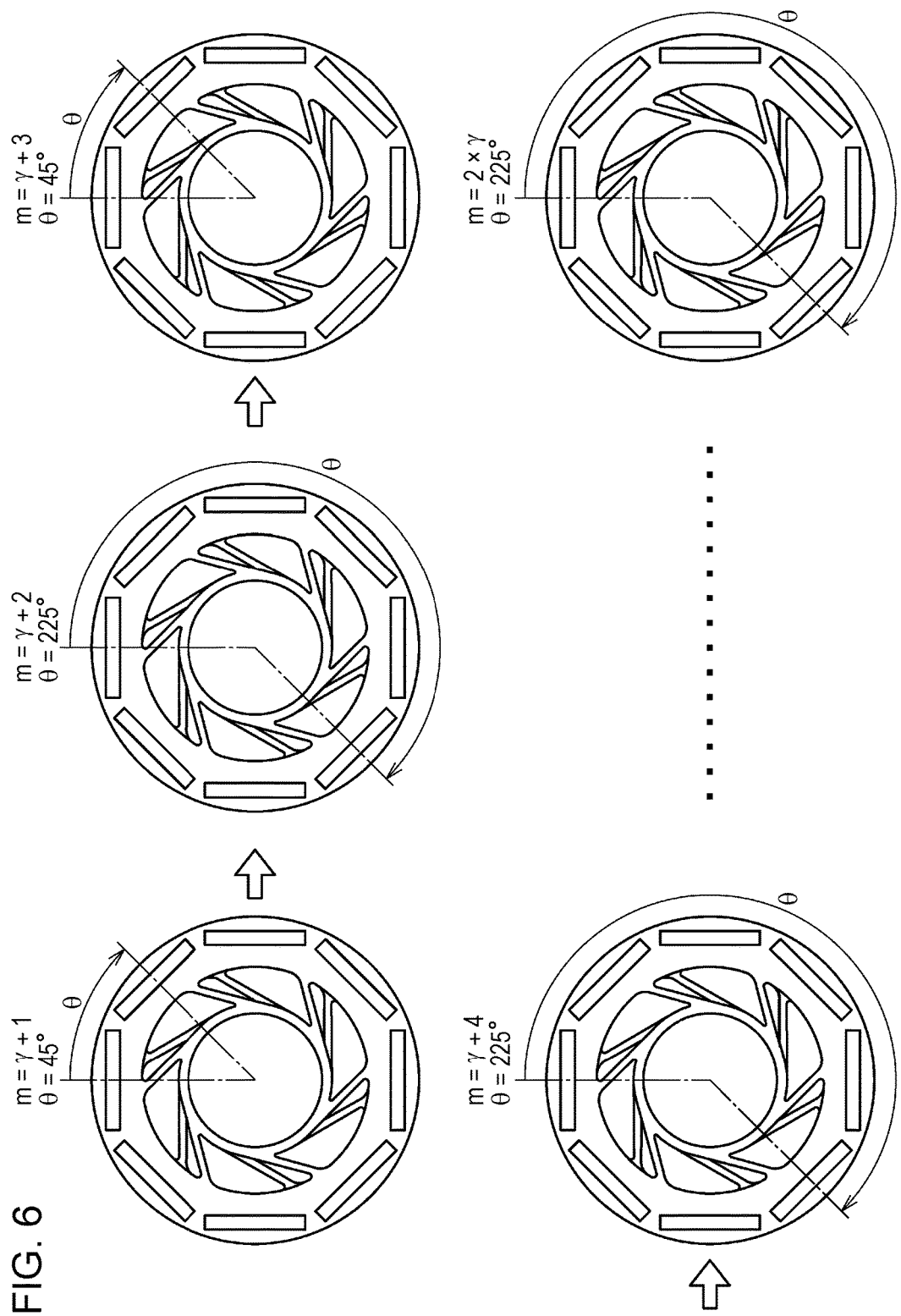
FIG. 6 is a view indicating production steps of the rotor core according to the first embodiment of the disclosure and indicating how the rotational stacking of the steel plates is performed in the production steps of the second core block.
Figure 7:
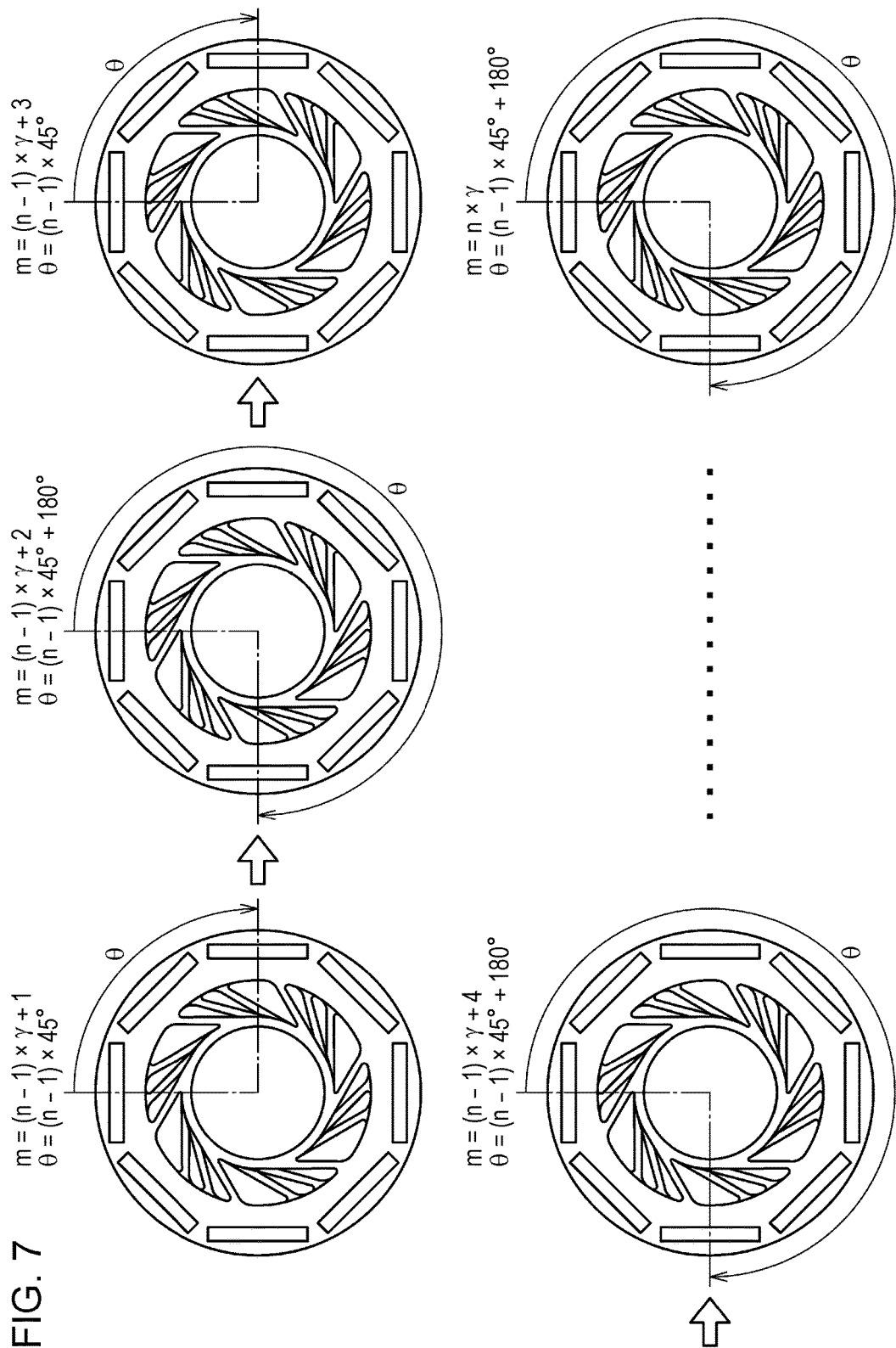
FIG. 7 is a view indicating production steps of the rotor core according to the first embodiment of the disclosure and indicating how the rotational stacking of the steel plates is performed in the production steps of the n-th core block.
Figure 8:
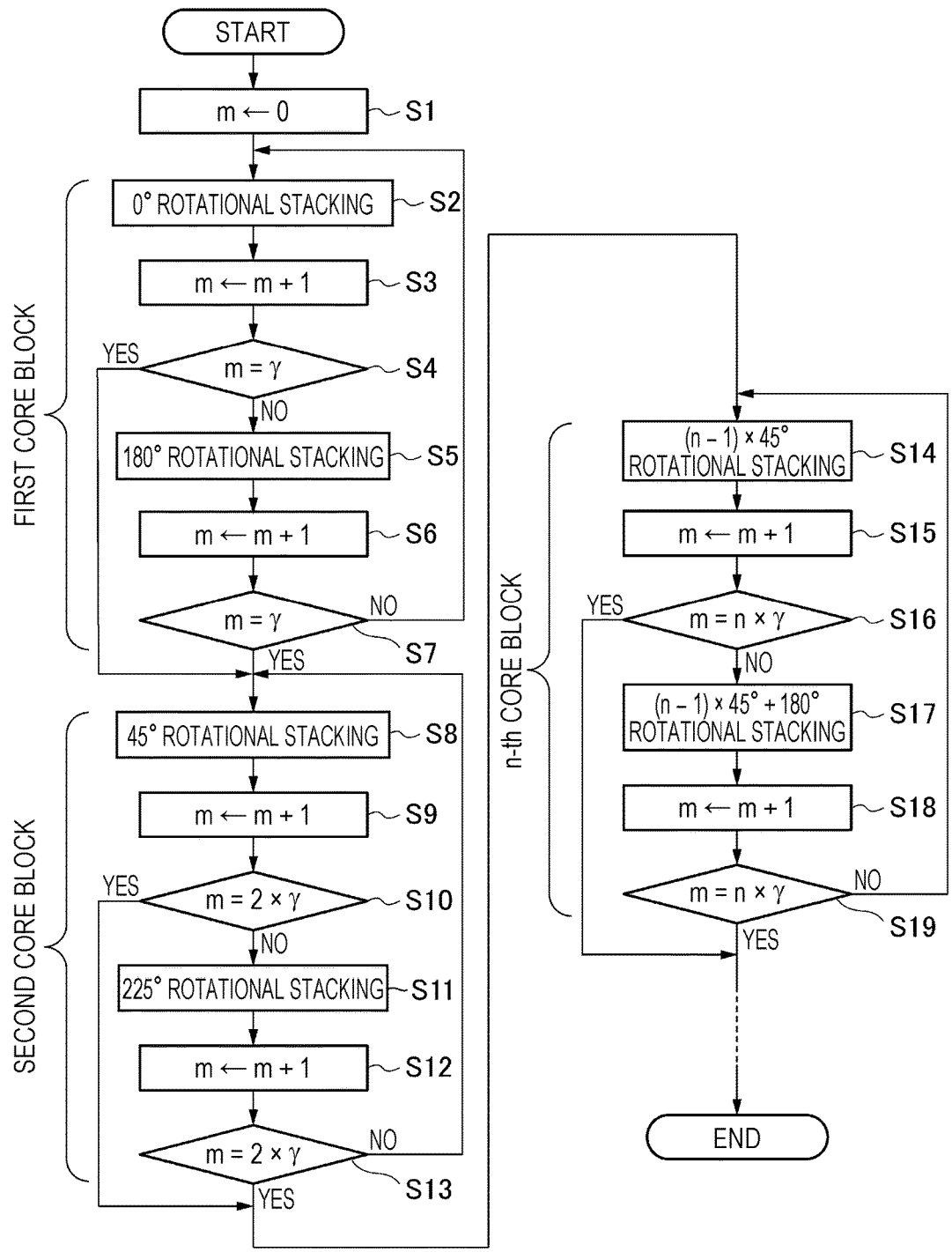
FIG. 8 is a flow chart indicating production steps of the rotor core according to the first embodiment of the present disclosure.

FIG. 5 to FIG. 7 are views indicating the production steps of the rotor core 5 according to the first embodiment of the present disclosure. FIG. 5, FIG. 6, and FIG. 7 are views indicating how the rotational stacking of the steel plates 1 is performed in the production steps of the first core block B1, the second core block B2, and the n-th core block Bn, respectively. FIG. 8 is a flowchart indicating the production steps of the rotor core 5 according to the first embodiment of the present disclosure.

The rotor core 5 of the present embodiment is produced by using an apparatus configured to stamp out the steel plates 1 in a predetermined shape (see FIG. 3) from a steel plate strip and perform the rotational stacking to stack the steel plates 1 one by one at a predetermined rotational stacking angle.

As illustrated in FIG. 5 and FIG. 8, in the production steps of the first core block B1 (S1 to S7 in FIG. 8), the rotational stacking at the rotational stacking angle of 180°, which is the least common multiple of the first circumferential interval and the second circumferential interval, is performed to stack γ steel plates 1 one by one from the 0° position so as to produce the first core block B1. Specifically, the first steel plate 1 is rotated 0° (not rotated) and stacked, the second steel plate 1 is rotated 180° and stacked, the third steel plate is rotated 0° (not rotated) and stacked, and the fourth steel plate is rotated 180° and stacked. The rotational stacking is repeated until the number of the stacked steel plates 1 reaches γ. The first core block B1 is obtained in this way.

As illustrated in FIG. 6 and FIG. 8, in the production steps of the second core block B2 (S8 to S13 in FIG. 8), the rotational stacking at the rotational stacking angle of 180°, which is the least common multiple of the first circumferential interval and the second circumferential interval, is performed to stack γ steel plates 1 one by one from 45° position, which is a position shifted by an angle corresponding to the first circumferential interval relative to the first core block B1, to produce the second core block B2. Specifically, γ+1th steel plate 1 is rotated by 45° and stacked, γ+2th steel plate 1 is rotated by 225° and stacked, γ+3th steel plate 1 is rotated 45° and stacked, and γ+4th steel plate 1 is rotated 225° and stacked. The rotational stacking is repeated until the number of the stacked steel plates 1 reaches 2×γ. The second core block B2 is obtained in this way.

As illustrated in FIG. 7 and FIG. 8, in the production steps of the n-th core block Bn (S14 to S19 in FIG. 8), the rotational stacking at the rotational stacking angle of 180°, which is the least common multiple of the first circumferential interval and the second circumferential interval, is performed to stack γ steel plates 1 one by one from (n−1)× 45° position, which is a position shifted by an angle corresponding to the first circumferential interval relative to the (n−1)th core block B(n−1) so as to produce the second core block Bn. Specifically, (n−1)×γ+1th steel plate 1 is rotated by an angle of (n−1)×45° and stacked, (n−1)×γ+2th steel plate 1 is rotated by an angle of (n−1)×45°+180° and stacked, (n−1)×γ+3th steel plate 1 is rotated by an angle of (n−1)×45° and stacked, and (n−1)×γ+4th steel plate 1 is rotated by an angle of (n−1)×45°+180° and stacked. The rotational stacking is repeated until the number of the stacked steel plates 1 reaches n×γ. The n-th core block Bn is obtained in this way.

As described above, according to the method of producing the rotor 10 of the rotary electric machine of the present disclosure, the rotational stacking is performed to stack the steel plates 1 one by one so as to form the core blocks B1 to B4. This reduces the accumulated thickness deviation in the core blocks B1 to B4 and improves the dimensional accuracy of the rotor 10 without a decrease in the production efficiency. Each of the core blocks B1 to B4 may be removed from the die after the production thereof in the die, and the removed core blocks B1 to B4 may be rotated in the circumferential direction by the angle corresponding to the first circumferential interval (45°) and stacked so as to constitute the rotor core 5, which is mounted on a rotor shaft. In this case, the size of the die used in the production of the rotor core 5 is reduced. Alternatively, the rotor core 5 may be constituted by the steel plates 1 stacked in the die by the rotational stacking. In this case, the number of assembling steps is small compared with the case in which the core blocks B1 to B4 removed from the die are each attached to the rotor shaft so as to be displaced from the adjacent core blocks B1 to B4 by the angle corresponding to the first circumferential interval. In addition, the rotor core in the die is readily removed from the die, since the rotor core includes a large number of stacked steel plates.

The steel plates 1 are stacked by the rotational stacking at the rotational stacking angle corresponding to the common multiple of the first circumferential interval and the second circumferential interval. Thus, in the core blocks B1 to B4, the magnet insertion hole pieces 3a in the steel plates 1 are in communication with each other linearly in the axial direction and the through hole pieces 9a in the steel plates 1 are in communication with each other linearly in the axial direction, although the steel plates 1 are stacked one by one.

The core blocks B1 to B4 are stacked on one another by the rotational stacking at the rotational stacking angle corresponding to the first circumferential interval. Thus, the through holes 9 of the core blocks B1 to B4 are displaced from each other in the circumferential direction, preventing concentration of stress.

The through holes 9, which are arranged in the circumferential direction in each of the core blocks B1 to B4, are not in communication with each other in each core block B1 to B4, but are in communication with each other through the through holes 9 in the adjacent core blocks B1 to B4. This configuration accelerates the flow of a cooling medium flowing through the through holes 9 in the circumferential direction and reduces the eccentricity of the rotor 10 due to accumulation of the cooling medium.

The use of the least common multiple of the first circumferential interval and the second circumferential interval as the common multiple minimizes the rotational stacking angle of the steel plates 1 and further reduces the accumulated thickness deviation in the core blocks B1 to B4.

Second Embodiment

The rotor core 5 according to a second aspect of the present disclosure and a method of producing the same are described with reference to FIG. 9 to FIG. 12. Components identical to those in the first embodiment are assigned the same reference numerals as those in the first embodiment and are not described in detail.

Figure 9:
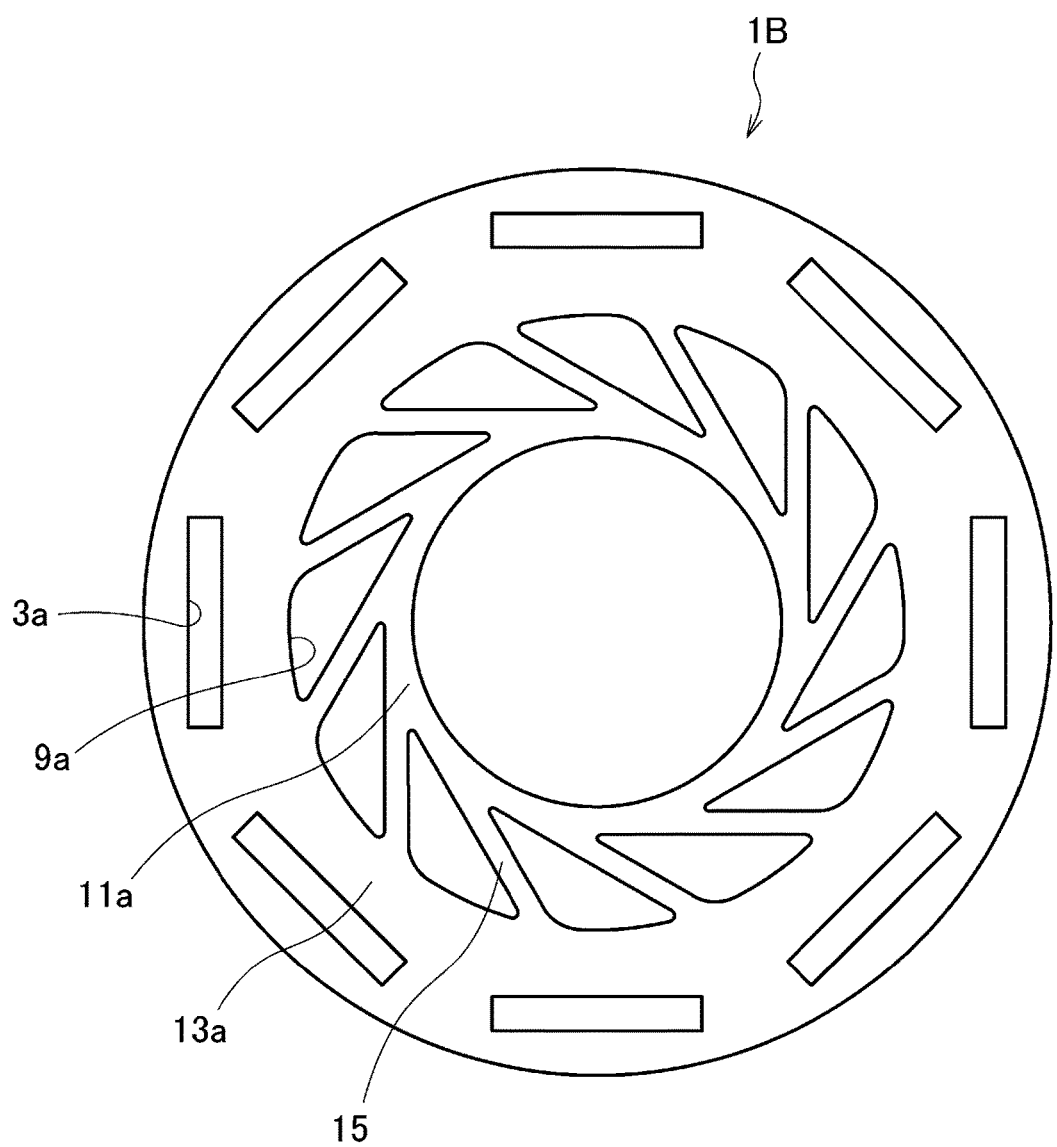
FIG. 9 is a front view of a steel plate included in a rotor core according to a second embodiment of the present disclosure.
Figure 10:
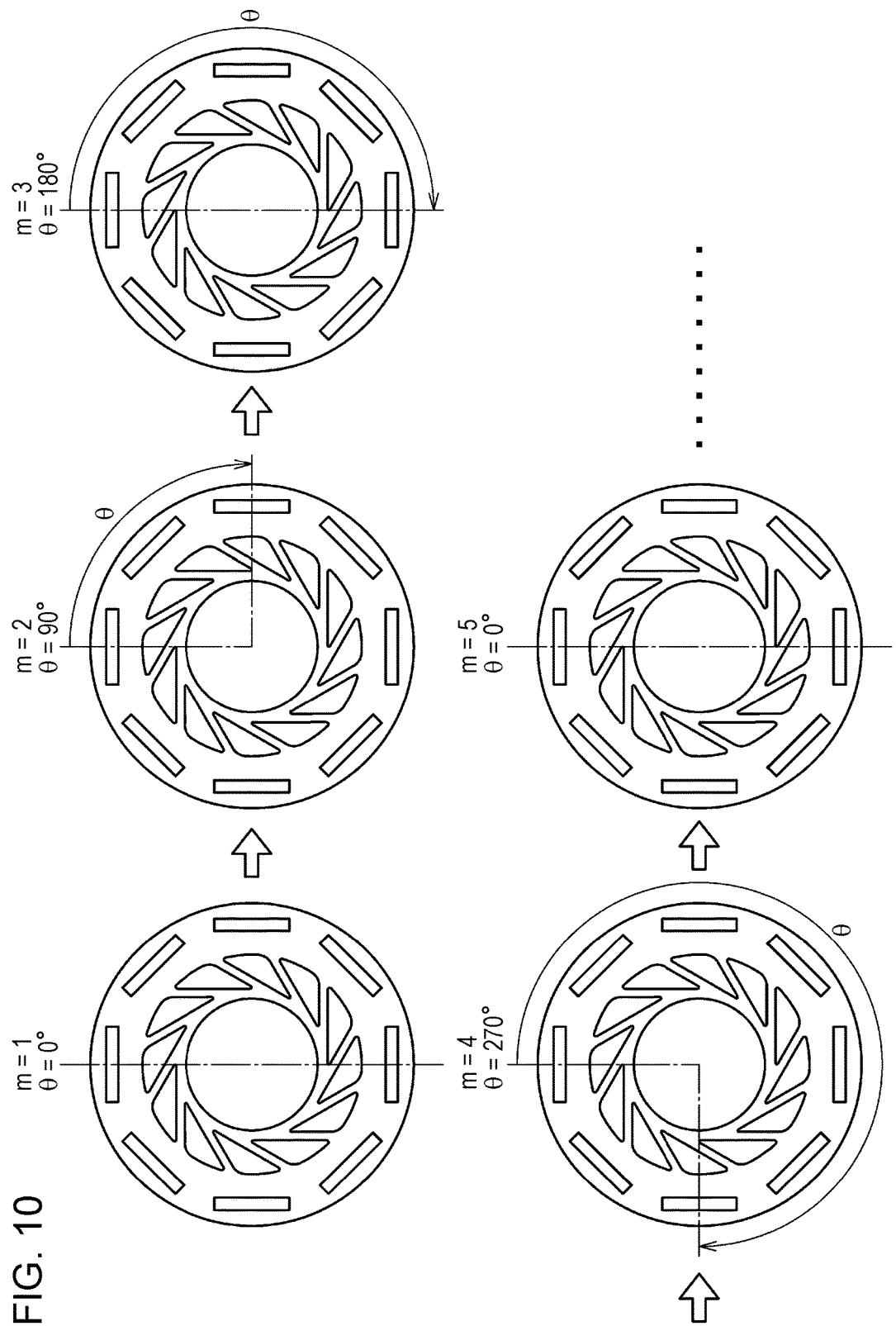
FIG. 10 is a view indicating production steps of the rotor core according to the second embodiment of the disclosure and indicating how the rotational stacking of the steel plates is performed in the production steps of the first core block.
Figure 11:
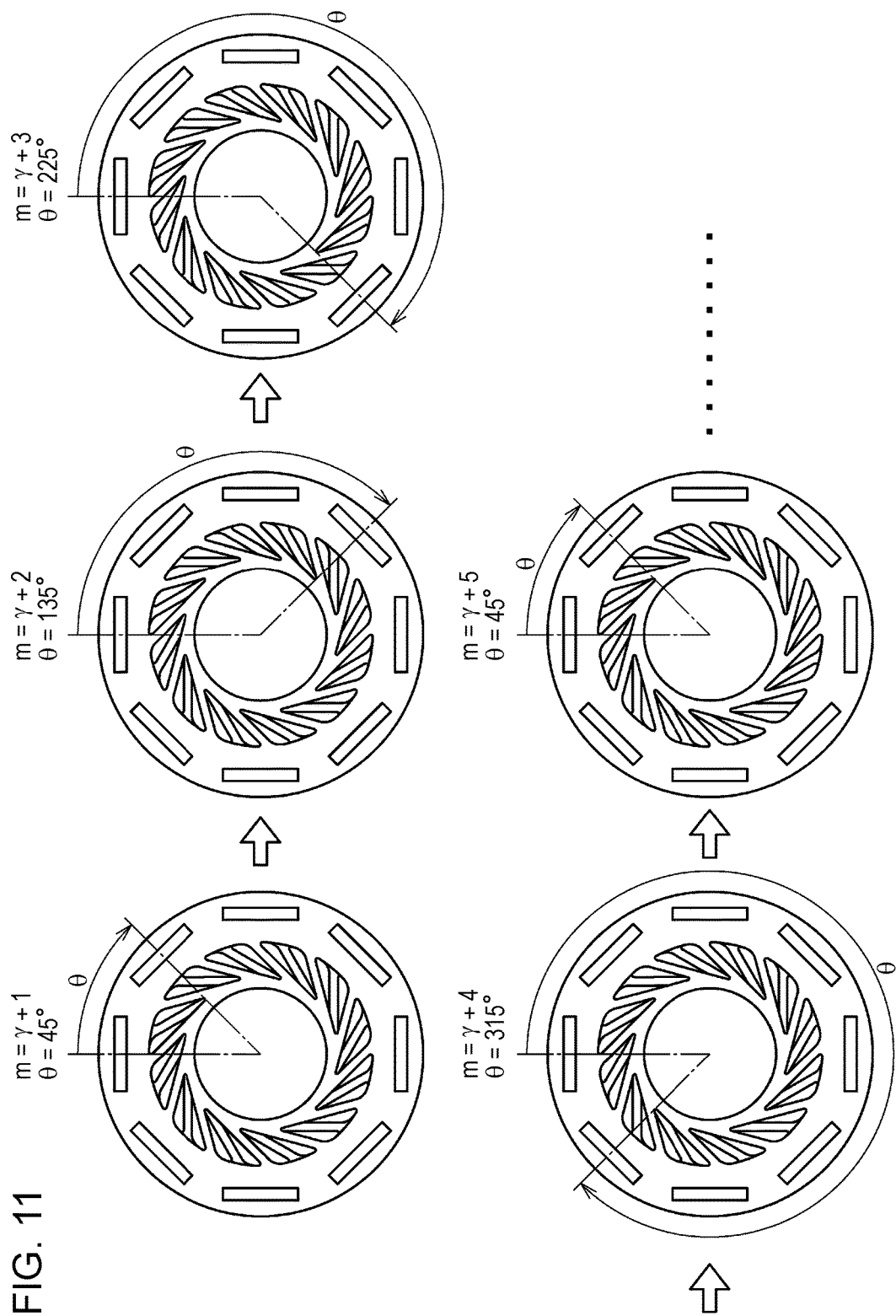
FIG. 11 is a view indicating production steps of the rotor core according to the second embodiment of the disclosure and indicating how the rotational stacking of the steel plates is performed in the production steps of the second core block.
Figure 12:
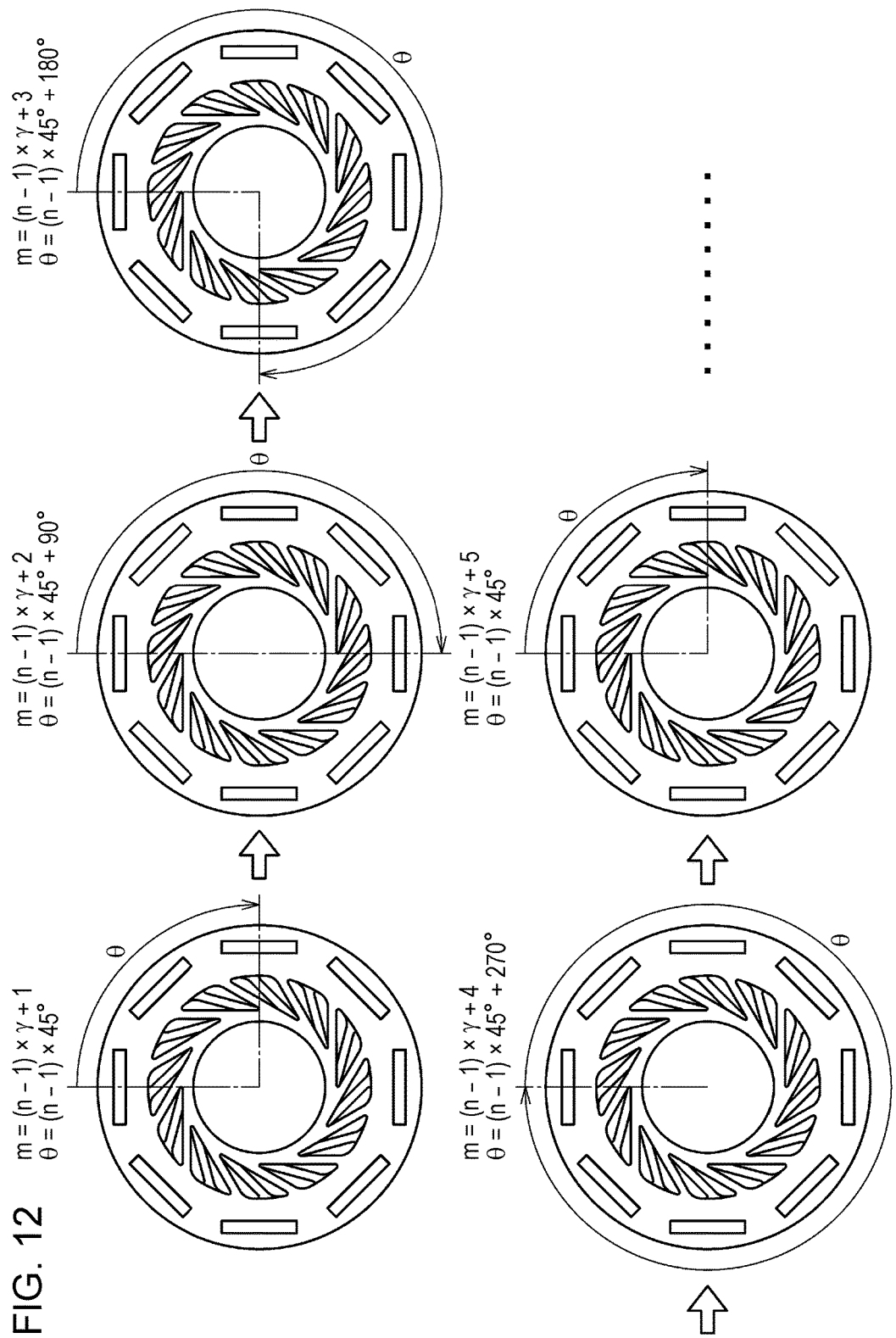
FIG. 12 is a view indicating production steps of the rotor core according to the second embodiment of the disclosure and indicating how the rotational stacking of the steel plates is performed in the production steps of the n-th core block.
Figure 13:
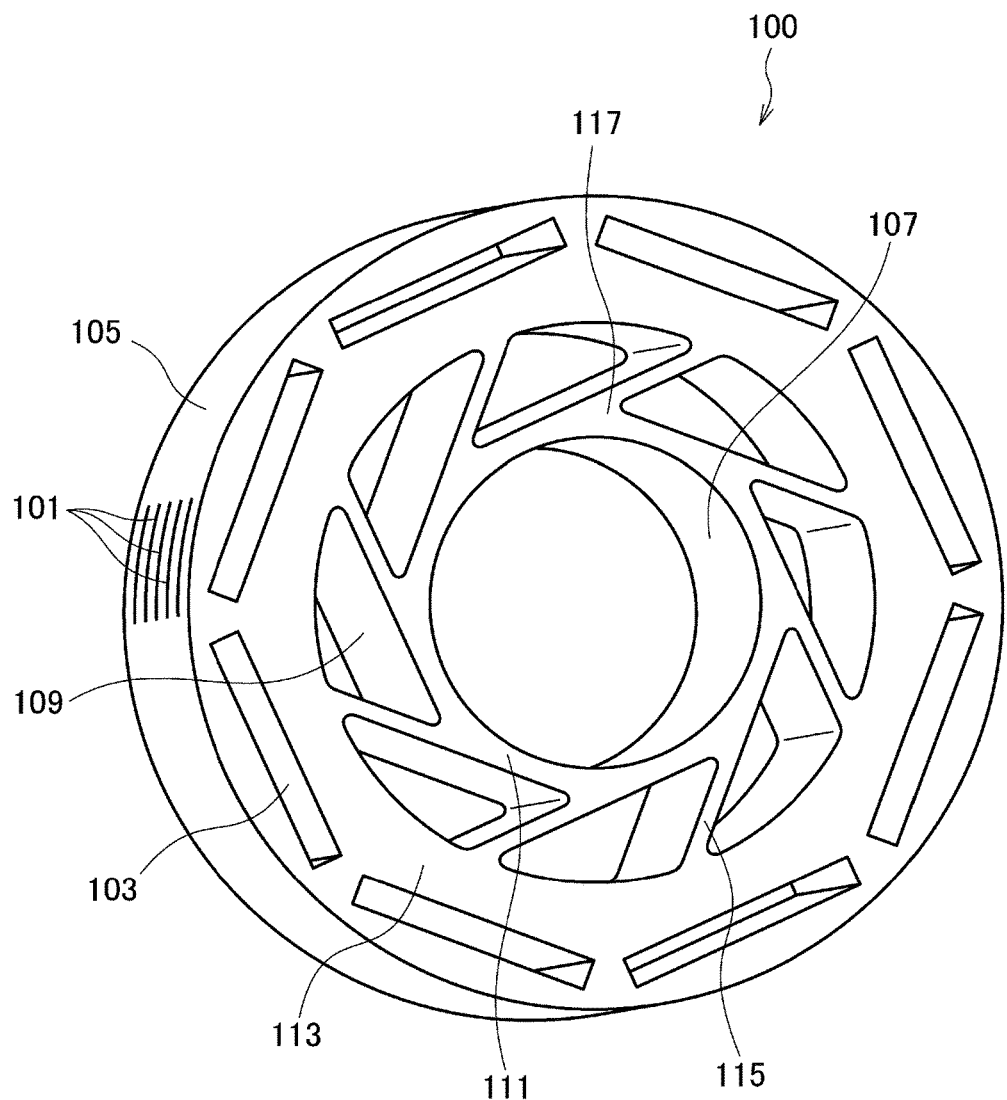
FIG. 13 is a perspective view of a conventional rotor (rotor core).
Figure 14:
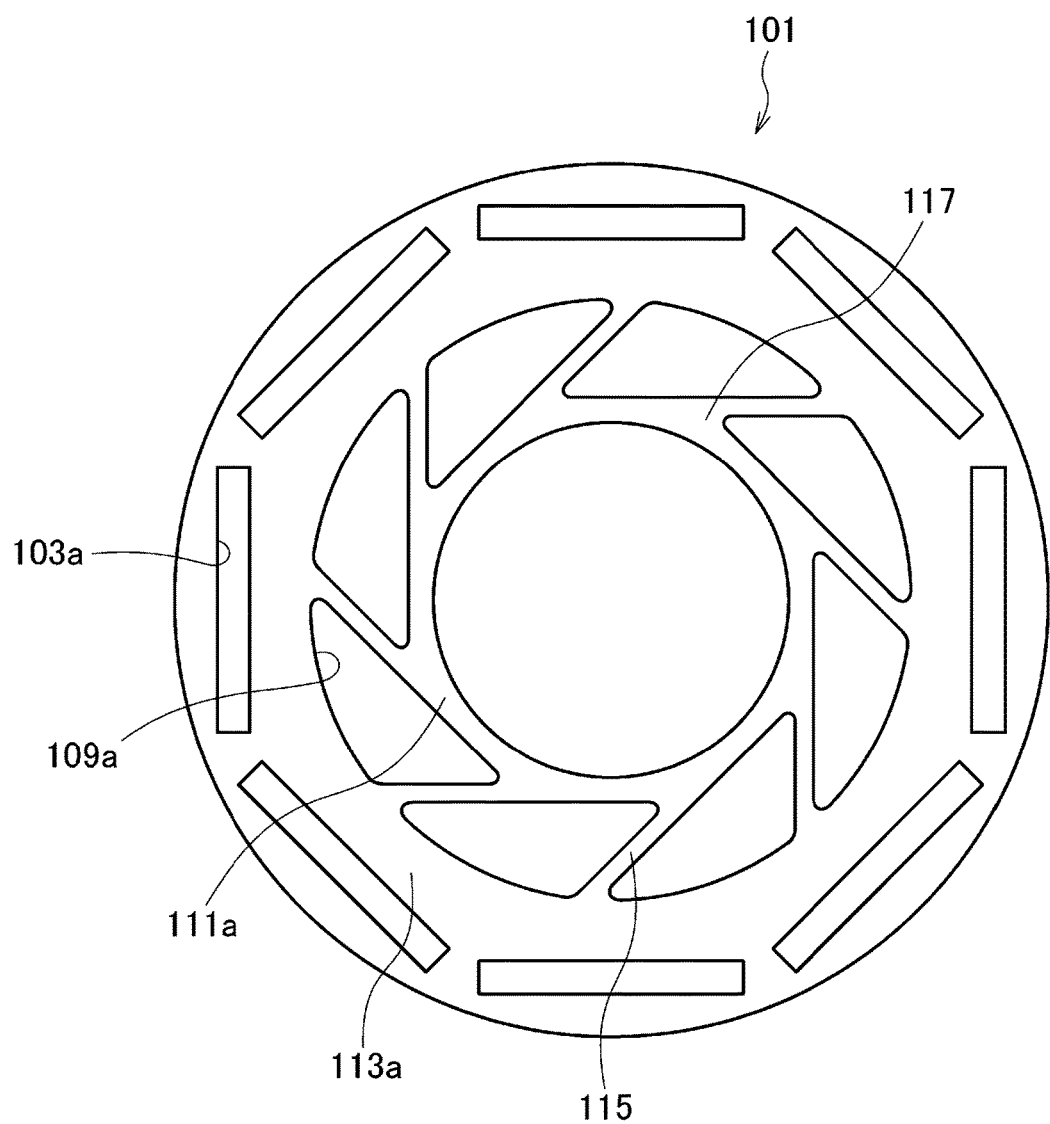
FIG. 14 is a front view of a steel plate included in the conventional rotor core.

FIG. 9 is a front view of a steel plate 1B included in a rotor core 5 according to the second embodiment. FIG. 10 to FIG. 12 are views indicating production steps of the rotor core 5 according to the second embodiment. FIG. 10, FIG. 11, and FIG. 12 indicate how the rotational stacking of the steel plates 1B is performed in the production steps of the first core block B1, the second core block B2, and the n-th core block Bn, respectively.

As illustrated in FIG. 9, the steel plate 1B included in the rotor core 5 according to the second embodiment differs from the steel plate 1 in the first embodiment in that the number of the through hole pieces 9a is twelve. Hereinafter, the method of producing the rotor core 5 according to the second embodiment is described with reference to FIG. 10 to FIG. 12. In the following description, the number of the magnet insertion hole pieces 3a is eight, the number of the through hole pieces 9a is twelve, the first circumferential interval is 45°, the second circumferential interval is 30°, the common multiple (least common multiple) of the first and second circumferential interval is 90°, the number of the steel plates 1B included in each core block B1 to B4 is γ, a rotational stacking angle of the steel plate 1B is θ, and the number of the stacked steel plates 1B is m. The number of core blocks B1 to B4 is not determined.

As illustrated in FIG. 10, in the production steps of the first core block B1, the rotational stacking at the rotational stacking angle of 90°, which corresponds to the least common multiple of the first circumferential interval and the second circumferential interval, is performed to stack γ steel plates 1B one by one from the 0° position so as to produce the first core block 31. Specifically, the first steel plate 1B is rotated 0° (not rotated) and stacked, the second steel plate 1B is rotated 90° and stacked, the third steel plate 1B is rotated 180° and stacked, the fourth steel plate 1B is rotated 270° and stacked, and the fifth steel plate 1B is rotated 0° (not rotated) and stacked. The rotational stacking is repeated until the number of the steel plates 1B reaches γ. The first core block B1 is obtained in this way.

As illustrated in FIG. 11, in the production steps of the second core block B2, the rotational stacking at the rotational stacking angle of 90°, which corresponds to the least common multiple, is performed to stack γ steel plates 1B one by one from the 45° position, which is a position shifted by the angle corresponding to the first circumferential interval relative to the first core block B1, so as to produce the second core lock B2. Specifically, γ+1th steel plate 1B is rotated by 45° and stacked, γ+2th steel plate 1B is rotated 135° and stacked, γ+3th steel plate 1B is rotated 225° and stacked, γ+4th steel plate 1B is rotated 315° and stacked, and γ+5th steel plate 1B is rotated 45° and stacked. The rotational stacking is repeated until the number of the steel plates 1B reaches 2×γ. The second core block B2 is obtained in this way.

As illustrated n FIG. 12, in the production steps of the n-th core block Bn, the rotational stacking at the rotational stacking angle of 90°, which corresponds to the least common multiple, is performed to stack γ steel plates 1B one by one from the (n−1)×45° position, which is a position shifted by the angle corresponding to the first circumferential interval relative to the (n−1)th core block B(n−1), so as to produce the n-th core block Bn. Specifically, (n−1)×γ+1th steel plate 1B is rotated by an angle of (n−1)×45° and stacked, (n−1)×γ+2th steel plate 1B is rotated by an angle of (n−1)×45°+90° and stacked, (n−1)×γ+3th steel plate 1B is rotated by an angle of (n−1)×45°+180° and stacked, (n−1)×γ+4th steel plate 1B is rotated by angle of (n−1)×45°+270° and stacked, and (n−1)×γ+5th steel plate 1B is rotated by the angle of (n−1)×45° and stacked. The rotational stacking is repeated until the number of the steel plates 1B reaches n×γ. The n-th core block Bn is produced in this way.

The present disclosure is not limited to the above-described embodiment, and may be modified or improved. The number of the magnetic insertion hole pieces 3a in the steel plate 1 or 1B, the number of the through hole pieces 9a (≠number of the magnetic insertion hole piece 3a), the first circumferential interval, second circumferential interval (≠the first circumferential interval), the common multiple of the first circumferential interval and the second circumferential interval, the number of the steel plates 1 or 1B included in the core blocks B1 to B4, or the number of the core blocks B1 to B4 may be suitably changed. In the above-described embodiments, the rotational stacking is performed for every steel plate. However, the rotational stacking may be performed for every second or every predetermined steel plate.

According to a first aspect of the embodiment, a rotor (rotor 10 in the embodiment) of a rotary electric machine includes a rotor core (rotor core 5 in the embodiment) having a plurality of magnet insertion holes (magnet insertion holes 3 in the embodiment) arranged at first circumferential intervals (first circumferential intervals of 45° in the embodiment) and permanent magnets disposed in the magnet insertion holes. The rotor core includes a plurality of steel plates (steel plates 1 in the embodiment) each having a plurality of magnetic insertion hole pieces (magnet insertion hole pieces 3a in the embodiment) and a plurality of through hole pieces (through hole pieces 9a in the embodiment). The magnetic insertion hole pieces are arranged at the first circumferential intervals and constitute the magnetic insertion holes when the steel plates are stacked on one another. The through hole pieces are arranged at second circumferential intervals (second circumferential intervals of 60° in the embodiment) different from the first circumferential interval and extend through the steel plates in an axial direction. The rotor core includes a first core block (first core block B1 in the embodiment) including the steel plates stacked by rotational stacking at a rotational stacking angle corresponding to a common multiple (common multiple of 180° in the embodiment) of the first circumferential interval and the second circumferential interval, and a second core block (second core block B2 in the embodiment) including the steel plates stacked by rotational stacking at the rotational stacking angle corresponding to the common multiple from a position shifted by an angle corresponding to the first circumferential interval relative to the first core block.

According to a second aspect of the embodiment, in the rotor of the rotary electric machine according to the first aspect, the common multiple is a least common multiple of the first circumferential interval and the second circumferential interval (180°, for example, which is a least common multiple in the embodiment).

According to a third aspect of the embodiment, a method of producing a rotor (rotor 10 in the embodiment) of a rotary electric machine is provided. The rotor includes a rotor core (rotor core 5 in the embodiment) and permanent magnets. The rotor core has a plurality of magnet insertion holes (magnet insertion holes 3 in the embodiment) arranged at first circumferential intervals (first circumferential intervals of 45°). The rotor core includes a plurality of steel plates (steel plates 1 in the embodiment) each having a plurality of magnetic insertion hole pieces (magnet insertion hole pieces 3a in the embodiment) arranged at the first circumferential intervals and constitute the magnetic insertion holes when the steel plates are stacked on one another, and a plurality of through hole pieces (through hole pieces 9a in the embodiment) arranged at second circumferential intervals (second circumferential intervals of 60° in the embodiment) different from the first circumferential intervals and extending through the steel plate in an axial direction. The permanent magnets are disposed in the magnet insertion holes. The method includes producing the rotor core. The step of producing the rotor core includes performing a first rotational stacking step at a rotational stacking angle corresponding to a common multiple of the first circumferential interval and the second circumferential interval (common multiple of 180° in the embodiment) so as to stack the plurality of steel plates and performing a second rotational stacking step at the rotational stacking angle corresponding to the common multiple from a position shifted by an angle corresponding to the first circumferential interval relative to the plurality of steel plates stacked in the first rotational stacking step so as to stack the plurality of steel plates.

According to a fourth aspect of the embodiment, a method of producing a rotor (rotor 10 in the embodiment) of a rotary electric machine is provided. The rotor includes a rotor core (rotor core 5 in the embodiment) and permanent magnets. The rotor core has a plurality of magnet insertion holes (magnet insertion holes 3 in the embodiment) arranged at first circumferential intervals (first circumferential intervals of 45°). The rotor core includes a plurality of steel plates (steel plates 1 in the embodiment) each having a plurality of magnetic insertion hole pieces (magnet insertion hole pieces 3a in the embodiment) arranged at the first circumferential intervals and constitute the magnetic insertion holes when the steel plates are stacked on one another, and a plurality of through hole pieces (through hole pieces 9a in the embodiment) arranged at second circumferential intervals (second circumferential intervals of 60° in the embodiment) different from the first circumferential intervals and extending through the steel plate in an axial direction. The permanent magnets are disposed in the magnet insertion holes. The method includes producing the rotor core. The step of producing the rotor core includes forming a first core block (first core block B1 in the embodiment) by rotational stacking of the plurality of steel plates at a rotational stacking angle corresponding to a common multiple (common multiple of 180° in the embodiment) of the first circumferential interval and the second circumferential interval (steps S1 to S7 in the embodiment) and forming a second core block (second core block B2 in the embodiment) by the rotational stacking of the plurality of steel plates at the rotational stacking angle corresponding to the common multiple from a position shifted by the angle of the first circumferential interval relative to the first core block (steps S8 to S13 in the embodiment). for example) of the first circumferential interval and the second circumferential interval (steps S1 to S7 in the embodiment described below) and forming a second core block (second core block B2 in the embodiment described below, for example) by the rotational stacking of the plurality of steel plates at the rotational stacking angle corresponding to the common multiple from a position shifted by the angle of the first circumferential interval relative to the first core block (steps S8 to S13 in the embodiment described below).

In the first and fourth aspects, the core block is formed by the rotational stacking of the steel plates. This reduces the accumulated thickness deviation in the core block and improves dimensional accuracy of the rotor without a decrease in the production efficiency. In addition, the steel plates are stacked by the rotational stacking at the rotational stacking angle corresponding to the common multiple of the first circumferential interval and the second circumferential interval. Thus, in the core blocks, the magnet insertion hole pieces are in communication with each other linearly in the axial direction and the through hole pieces are in communication with each other linearly in the axial direction, although the steel plates are stacked by the rotational stacking. In addition, the core blocks are stacked by the rotational stacking at the rotational stacking angle corresponding to the first circumferential interval. Thus, the through holes in one of the core blocks and the through holes in adjacent core blocks are displaced from each other in the circumferential direction. This configuration prevents concentration of stress. In addition, the through holes of the core block, which are arranged in the circumferential direction, are in communication with each other through the through holes in adjacent core blocks while the through holes in the same core block are not in communication with each other. This configuration accelerates the flow of the refrigerant medium through the through holes in the circumferential direction and reduces eccentricity of the rotor due to the accumulation of the refrigerant medium.

In the second aspect, the rotational stacking of the steel plates is performed at the rotational stacking angle corresponding to the least common multiple of the first circumferential interval and the second circumferential interval to form the core block. This configuration minimizes the rotational stacking angle of the steel plates and further reduces the accumulated thickness deviation in the core block.

In the third aspect of the disclosure, the rotor core is obtained by the rotational stacking of the steel plates. This reduces the accumulated thickness deviation in the rotor core and improves the dimensional accuracy of the rotor without a decrease in the production efficiency. In the steel plates, which are stacked in the first rotational stacking step and the second rotational stacking step, the magnet insertion hole pieces are in communication with each other linearly in the axial direction and the through hole pieces are in communication with each other linearly in the axial direction, since the steel plates are stacked by the rotational stacking at the rotational stacking angle corresponding to the common multiple of the first circumferential interval and the second circumferential interval. The thorough holes in the steel plates stacked in the first rotational stacking step and the through holes in the steel plates stacked in the second rotational stacking step are displaced from each other by the angle corresponding to the difference between the first circumferential interval and the second circumferential interval, since the steel plates are stacked in the second rotational stacking step after being rotated relative to the steel plates stacked in the first rotational stacking step by the angle corresponding to the first circumferential interval. This prevents concentration of the stress. In addition, the adjacent through holes in each of the steel plates stacked in the first rotational stacking step are allowed to be in communication with each other through the through holes in the steel plates stacked in the second rotational stacking step. This accelerates the flow of the cooling medium in the circumferential direction through the through holes, reducing eccentricity of the rotor due to the accumulation of the cooling medium.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor of a rotary electric machine comprising:
a rotor core having a plurality of magnet insertion holes arranged at first circumferential intervals, the rotor core including a plurality of steel plates each having:
a plurality of magnetic insertion hole pieces arranged at the first circumferential intervals and constituting the plurality of magnetic insertion holes when the plurality of steel plates are stacked on one another; and
a plurality of through hole pieces arranged at second circumferential intervals different from the first circumferential intervals and extending through the plurality of steel plates in an axial direction; and
permanent magnets disposed in the plurality of magnet insertion holes, wherein
the rotor core includes:
a first core block including the plurality of steel plates stacked by rotational stacking at a rotational stacking angle equal to a common multiple of the first circumferential interval and the second circumferential interval such that a pair of adjacent ones of the steel plates of the first core block are stacked at differing rotational positions, and
a second core block including the plurality of steel plates stacked by the rotational stacking at the rotational stacking angle equal to the common multiple from a position shifted by an angle corresponding to the first circumferential interval, the position being shifted relative to the first core block.

2. The rotor according to claim 1, wherein the common multiple is a least common multiple of the first circumferential interval and the second circumferential interval.

3. The rotor according to claim 1, wherein the rotational stacking angle is 180 degrees or 90 degrees.

4. The rotor according to claim 1, wherein the magnetic insertion hole pieces of the first core block and the second core block are aligned such that a first one of the permanent magnets is configured to be disposed within one of the magnet insertion holes while extending within the first core block and the second core block.

5. The rotor according to claim 1, wherein the first circumferential interval and the second circumferential interval have different values.

6. The rotor according to claim 1, wherein the position shifted by the angle is shifted by an amount equal to the first circumferential interval.

7. The rotor according to claim 6, wherein the rotational stacking angle is larger than the first circumferential interval.

8. A method of producing a rotor of a rotary electric machine, the rotor including:

a rotor core having a plurality of magnet insertion holes
arranged at first circumferential intervals, the rotor core
including a plurality of steel plates each having:
a plurality of magnetic insertion hole pieces arranged at
the first circumferential intervals and constituting the
plurality of magnetic insertion holes when the plurality of steel plates are stacked on one another; and
a plurality of through hole pieces arranged at second
circumferential intervals different from the first circumferential intervals and extending through the
plurality of steel plates in an axial direction; and
permanent magnets disposed in the plurality of magnet
insertion holes,
the method comprising producing the rotor core, the step
of producing the rotor core including:
performing a first rotational stacking step at a rotational
stacking angle equal to a common multiple of the first
circumferential interval and the second circumferential
interval so as to stack the plurality of steel plates such
that a pair of adjacent ones of the steel plates of a first
core block are stacked at differing rotational positions;
and
performing a second rotational stacking step at the rotational stacking angle equal to the common multiple
from a position shifted by an angle corresponding to the
first circumferential interval, the position being shifted
relative to the plurality of steel plates stacked in the first
rotational stacking step, so as to stack the plurality of
steel plates of a second core block.

9. A method of producing a rotor of a rotary electric
machine, the rotor including:
a rotor core having a plurality of magnet insertion holes
arranged at first circumferential intervals, the rotor core
including a plurality of steel plates each having:
a plurality of magnetic insertion hole pieces arranged at
the first circumferential intervals and constituting the
plurality of magnetic insertion holes when the plurality of steel plates are stacked on one another; and
a plurality of through hole pieces arranged at second
circumferential intervals different from the first circumferential intervals and extending through the
plurality of steel plates in an axial direction; and
permanent magnets disposed in the plurality of magnet
insertion holes,
the method comprising producing the rotor core, the step
of producing the rotor core including:
forming a first core block by rotational stacking of the
plurality of steel plates at a rotational stacking angle
equal to a common multiple of the first circumferential
interval and the second circumferential interval such
that a pair of adjacent ones of the steel plates of the first
core block are stacked at differing rotational positions;
forming a second core block by the rotational stacking of
the plurality of steel plates at the rotational stacking
angle equal to the common multiple from a position
shifted by the angle of the first circumferential interval,
the position being shifted relative to the first core block.

10. A rotor of a rotary electric machine, comprising:
a rotor core having magnet insertion holes which are
arranged at first circumferential intervals and in which
permanent magnets are disposed, the rotor core comprising:
steel plates stacked in an axial direction of the rotor and
each comprising:
magnetic insertion hole pieces arranged at the first
circumferential intervals to constitute the magnetic insertion holes; and
through hole pieces arranged at second circumferential intervals to extend through the steel plates in
the axial direction;
a first core block including first steel plates among the
steel plates stacked with rotational stacking at a
rotational stacking angle equal to a common multiple
of a first circumferential interval among the first
circumferential intervals and a second circumferential interval among the second circumferential intervals such that a pair of adjacent ones of the first steel
plates are stacked at differing rotations; and
a second core block including second steel plates
among the steel plates stacked with the rotational
stacking at the rotational stacking angle from a
position shifted by an angle corresponding to the first
circumferential interval, the position being shifted
relative to the first core block.

11. The rotor according to claim 10, wherein the common
multiple is a least common multiple of the first circumferential interval and the second circumferential interval.

12. The rotor according to claim 10,
wherein the first core block has first through holes
arranged at the second circumferential intervals to
extend through the first core block,
wherein the second core block has second through holes
arranged at the second circumferential intervals to
extend through the second core block, and
wherein the first through holes and the second through
holes are displaced from each other by an angle corresponding to a difference between the first circumferential interval and the second circumferential interval
and are in communication with each other.

13. The rotor according to claim 10, wherein the rotational
stacking angle is 180 degrees or 90 degrees.

14. The rotor according to claim 10, wherein the magnetic
insertion hole pieces of the first core block and the second
core block are aligned such that a first one of the permanent
magnets is configured to be disposed within a first one of the
magnet insertion holes while extending within the first core
block and the second core block.

15. The rotor according to claim 10, wherein the first
circumferential interval and the second circumferential
interval have different values.

16. The rotor according to claim 10, wherein the position
shifted by the angle is shifted by an amount equal to the first
circumferential interval.

17. The rotor according to claim 16, wherein the rotational
stacking angle is larger than the first circumferential interval.

18. A method of producing a rotor of a rotary electric
machine, comprising:
providing steel plates, the rotor including a rotor core
having magnet insertion holes which are arranged at
first circumferential intervals and in which permanent
magnets are disposed, the rotor core including the steel
plates stacked in an axial direction of the rotor, each of
the steel plates comprising:
magnetic insertion hole pieces arranged at the first
circumferential intervals to constitute the magnetic
insertion holes; and
through hole pieces arranged at second circumferential
intervals to extend through the steel plates in the
axial direction;
stacking first steel plates among the steel plates with first
rotational stacking at a rotational stacking angle equal
to a common multiple of a first circumferential interval
among the first circumferential intervals and a second
circumferential interval among the second circumferential intervals such that a pair of adjacent ones of the first steel plates are stacked at differing rotational positions; and stacking second steel plates among the steel plates with second rotational stacking at the rotational stacking angle from a position shifted by an angle corresponding to the first circumferential interval, the position being shifted relative to the first steel plates.

19. A method of producing a rotor of a rotary electric machine, comprising:

providing steel plates, the rotor including a rotor core having magnet insertion holes which are arranged at first circumferential intervals and in which permanent magnets are disposed, the rotor core including the steel plates stacked in an axial direction of the rotor, each of the steel plates comprising:

magnetic insertion hole pieces arranged at the first circumferential intervals to constitute the magnetic insertion holes; and through hole pieces arranged at second circumferential intervals to extend through the steel plates in the axial direction;

stacking first steel plates among the steel plates with rotational stacking at a rotational stacking angle equal to a common multiple of a first circumferential interval among the first circumferential intervals and a second circumferential interval among the second circumferential intervals so as to provide a first core block such that a pair of adjacent ones of the first steel plates are stacked at differing rotational positions; and stacking second steel plates among the steel plates with the rotational stacking at the rotational stacking angle from a position shifted by an angle corresponding to the first circumferential interval, the position being shifted relative to the first core block.

* * * * *